United States Patent
Choi et al.

(10) Patent No.: US 7,321,973 B2
(45) Date of Patent: Jan. 22, 2008

(54) SYSTEM FOR CONTROLLING POWER TO A SYSTEM PART USING A CONTROL UNIT AND WHEREIN THE POWER TO THE CONTROL UNIT IS CONTROLLED USING A POWER CONTROLLER

(75) Inventors: Yeong-bok Choi, Suwon (KR); Moon-kyou Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 459 days.

(21) Appl. No.: 10/831,366

(22) Filed: Apr. 26, 2004

(65) Prior Publication Data

US 2005/0010829 A1 Jan. 13, 2005

(30) Foreign Application Priority Data

Jun. 23, 2003 (KR) .................. 10-2003-0040839
Aug. 6, 2003 (KR) .................. 10-2003-0054479

(51) Int. Cl.
*G06F 1/00* (2006.01)
*G06F 1/26* (2006.01)

(52) U.S. Cl. .................. 713/320; 713/300; 713/324
(58) Field of Classification Search ................ 713/300, 713/320, 323, 324
See application file for complete search history.

(56) References Cited

U.S. PATENT DOCUMENTS

| | | | |
|---|---|---|---|
| 4,590,553 A | | 5/1986 | Noda |
| 5,815,652 A | * | 9/1998 | Ote et al. .................. 714/31 |
| 6,020,085 A | * | 2/2000 | Towle .................. 429/96 |
| 6,333,650 B1 | * | 12/2001 | Amin et al. .................. 327/143 |
| 6,802,014 B1 | * | 10/2004 | Suurballe .................. 713/300 |
| 7,028,195 B2 | * | 4/2006 | Kasprzak et al. .......... 713/300 |
| 7,031,463 B2 | * | 4/2006 | Pierce .................. 379/413 |
| 2004/0019814 A1 | * | 1/2004 | Pappalardo et al. ........ 713/300 |

FOREIGN PATENT DOCUMENTS

| | | |
|---|---|---|
| CN | 1405657 | 3/2003 |
| JP | 58-127262 | 7/1983 |
| JP | 5-307431 | 11/1993 |

(Continued)

OTHER PUBLICATIONS

Korean Office Action for Application No. 10-2003-0054479.

(Continued)

*Primary Examiner*—Thomas Lee
*Assistant Examiner*—Mark Connolly

(57) ABSTRACT

An electronic device includes a system part having a plurality of electronic components; a system power supply outputting a system operating power by transforming electrical power supplied from the battery pack into the system operating power to operate the system part; a power selector outputting a system power selecting signal to turn the system part on/off according to an operation of a user; a micro control unit (MCU) controlling whether the system operating power of the system power supply is output; and an MCU power controller determining whether a control power to turn the MCU on is supplied by transforming electrical power supplied from the battery pack into the control power, based on the system power selecting signal transmitted from the power selector and controlling the MCU to be turned on/off.

43 Claims, 11 Drawing Sheets

FOREIGN PATENT DOCUMENTS

| | | |
|---|---|---|
| JP | 5-346832 | 12/1993 |
| JP | 9-62413 | 3/1997 |
| JP | 11-296265 | 10/1999 |
| JP | 11296265 A * | 10/1999 |
| JP | 2001242966 A * | 9/2001 |
| JP | 2002-373037 | 12/2002 |
| JP | 2003-125312 | 4/2003 |
| KR | 1998-021807 | 7/1998 |
| KR | 20-0180849 | 5/2000 |
| KR | 2002-96222 | 12/2002 |
| KR | 1020030024068 | 3/2003 |
| KR | 2003-30333 | 4/2003 |
| KR | 2003-48673 | 6/2003 |

OTHER PUBLICATIONS

Translated Summary of Korean Office Action for Application No. 10-2003-0054479.

Japanese Office Action; Application No. 2004-103902; mail date Feb. 28, 2006.

Chinese Office Action for Application No. 2004100616062; dated Nov. 4, 2005.

* cited by examiner

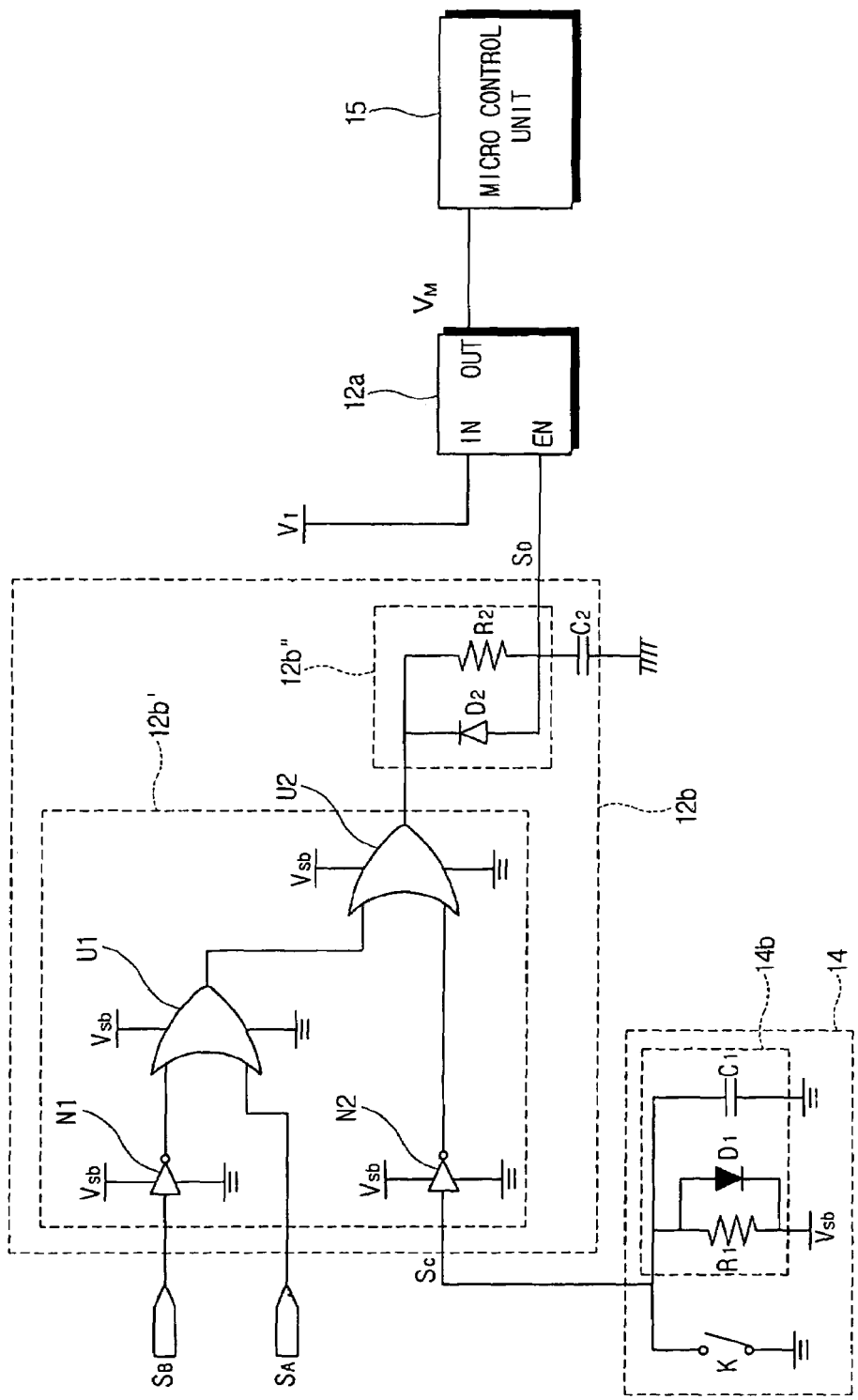

SYSTEM FOR CONTROLLING POWER TO A SYSTEM PART USING A CONTROL UNIT AND WHEREIN THE POWER TO THE CONTROL UNIT IS CONTROLLED USING A POWER CONTROLLER

CROSS-REFERENCE TO RELATED APPLICATIONS

This application claims the benefit of Korean Patent Application No. 2003-040839, filed on Jun. 23, 2003 in the Korean Intellectual Property Office, and Korean Patent Application No. 2003-054479, filed on Aug. 6, 2003 in the Korean Intellectual Property Office, the disclosures of which are incorporated herein by reference.

BACKGROUND OF THE INVENTION

1. Field of the Invention

The present invention relates to an electronic device, and more particularly, to an electronic device in which electrical power required to operate a power supply system of the electronic device is minimized and a use time of a battery pack is prolonged.

2. Description of the Related Art

Electronic devices using a battery pack include a portable computer (such as a laptop computer, a notebook computer, a personal digital assistant(s) (PDA), and the like), a CD player, a video camcorder and the like. Electronic devices are generally used because they are handy to carry and can be used when a user is moving. Further, commercial alternating current is generally applied to these portable electronic devices by connecting an adapter.

The portable computer has been widely spread due to the development of the computer technique. Accordingly, a variety of methods have been developed to increase a charge capacity of the battery pack and to prolong use time thereof. Further, a method to prolong the use time of the battery pack having the same charge capacity same as the charge capacity of the conventional battery pack, (i.e., a method to prolong the use time of the battery pack) by minimizing electrical power consumption has been variously developed.

FIG. 1 is a control block diagram showing a power supply system of a conventional electronic device. As shown herein, a conventional electronic device has a system part 110 to operate a main function of the electronic device, a battery pack 100 and an adapter 200 to supply electrical power to the system part 110. A system power supply 111 outputs the system operating power by transforming electrical power supplied from the battery pack 100 or the adapter 200 into the system operating power to operate the system part 110.

The conventional electronic device further has a micro control unit 115 (MCU) controlling the system power supply 111 to supply/cut electrical power to the system part 110, a control power supply 112 to supply electrical power to the micro control unit 115 and a power selector 114 to output a system power selecting signal according to an operation of an user. Here, the MCU 115 turns the electronic device on/off by controlling the system power supply 111 to supply/cut electrical power to the system part 110 according to a system power selecting signal transmitted corresponding to the operation of the user. Diodes 121, 122 prevent currents of the adapter 200 and the battery pack 100 from flowing reversed.

However, in the power supply system of the conventional electric device, in order to sense the system power selecting signal transmitted from the power selector 114, the MCU 115 should be always turned on (i.e., electrical power should be always supplied from the control power supply 112). Thus, if the battery pack 100 supplies the electric power, the electrical power of the battery pack 100 is consumed without regard to use of the electronic device. For example, even if the battery pack 110 is 100% charged and the electronic device remains turned off, the battery pack 100 will be completely discharged after a predetermined time due to the power consumption by the MCU 115 and the like.

Moreover, where the MCU 115 has a memory such as an electrically erasable and programmable read only memory (EEPROM) to store information whether the electronic device is turned on, the MCU 115 consumes a great deal of electrical power, thereby increasing power consumption of the battery pack 100.

Further, the power supply system of the conventional computer causes frequent charge and discharge of the battery pack 100, thereby shortening the use time of the battery pack 100. If the adapter 200 is used, the problems described above are not caused, but electrical power is also unnecessarily consumed to store the information of on/off states for the electronic device.

SUMMARY OF THE INVENTION

Accordingly, it is an aspect of the present invention to provide an electronic device in which electrical power required to operate a power supply system of the electronic device is minimized and a use time of a battery pack is prolonged.

Additional aspects and/or advantages of the invention will be set forth in part in the description which follows and, in part, will be obvious from the description, or may be learned by practice of the invention.

According to an aspect of the present invention, an electronic device includes: a system part having a plurality of electronic components; a system power supply outputting system operating power by transforming electrical power supplied from the battery pack into the system operating power to operate the system part; a power selector outputting a system power selecting signal to turn the system part on/off according to an operation of a user; a micro control unit (MCU) controlling whether the system operating power of the system power supply is output; and an MCU power controller determining whether a control power to turn the micro control unit on is supplied by transforming electrical power supplied from the battery pack into the control power, based on the system power selecting signal transmitted from the power selector and controlling the micro control unit to be turned on/off.

According to an aspect of the invention, the MCU power controller has: a control power supply outputting the control power by being supplied of electrical power from the battery pack; and a control power on/off circuit controlling whether the control power supply outputs the control power, based on the system power selecting signal transmitted from the power selector.

According to an aspect of the invention, the micro control unit controls the system power supply to output the system operating power, if the control power supply supplies the control power.

According to an aspect of the invention, the electronic device further has a standby power supply supplying standby power to keep the control power on/off circuit and the power selector in a state available of being operated.

According to an aspect of the invention, the standby power supply outputs the standby power by being supplied with electrical power from a predetermined auxiliary battery or the battery pack.

According to an aspect of the invention, the micro control unit outputs a latch signal making the control power supply output the control power to the control power on/off circuit, if the micro control unit is turned on by being supplied with the control power from the control power supply.

According to an aspect of the invention, the control power on/off circuit outputs a control power selecting signal to control whether the control power of the control power supply is output, by logically operating the system power selecting signal and the latch signal.

According to an aspect of the invention, the control power on/off circuit controls the control power supply to output the control power at least one of the system power selecting signal and the latch signal has a predetermined logic value.

According to an aspect of the invention, the power selector has a first signal delay circuit delaying a time to change the logic value of the system power selecting signal, and the control power on/off circuit has a second signal delay circuit delaying a time to change a logic value of the control power selecting signal that is changed corresponding to the change of the logic value of the system power selecting signal.

According to an aspect of the invention, the control power on/off circuit outputs a control power selecting signal controlling the control power supply to output the control power if the time to change the logic value of the system power selecting signal and the time to be delayed by the first signal delay circuit is longer than the time to change the logic value of the control power selecting signal and to be delayed by the second signal delay circuit.

According to an aspect of the invention, the micro control unit outputs the latch signal making the control power supply cut output of the control power if it is sensed that the logic value of the system power selecting signal output from the power selector according to the operation of the user is changed, when the electronic device is turned on.

According to an aspect of the invention, the electronic device further has: an adapter transforming commercial alternating current input from the outside the electronic device into direct current and outputting the transformed direct current to the system power supply and the control power supply; an adapter sensor sensing whether electrical power is supplied through the adapter; a discharge switch supplying therethrough/cutting electrical power supplied from the battery pack to the system power supply and the control power supply; and a discharge switch controller turning the discharge switch off, if the adapter sensor senses that electrical power is supplied through the adapter.

According to an aspect of the invention, the adapter supplies electrical power to the standby power supply therethrough, and the electrical power supplied from the battery pack to the standby power supply is cut, if the discharge switch is off.

According to an aspect of the invention, the adapter sensor outputs an adapter sensing signal having the logic value according to whether electrical power is supplied through the adapter and the control power on/off circuit outputs the control power selecting signal by logically operating the system power selecting signal, the latch signal and the adapter sensing signal.

According to an aspect of the invention, the control power on/off circuit keeps outputting the control power selecting signal that controls the control power supply to output the control power, if the adapter sensor senses the logic value corresponding to the fact that the adapter supplies electrical power therethrough.

According to an aspect of the invention, the micro control unit outputs the latch signal to the control power on/off circuit to make the control power supply to output the control power, if the adapter sensor transmits the adapter sensing signal and the adapter sensor senses the adapter sensing signal of the logic value corresponding to the fact that the adapter supplies electrical power therethrough.

According to an aspect of the invention, the micro control unit controls whether the system operating power of the system power supply is output corresponding to the change in the logic value of the system power selecting signal output from the power selector, if the adapter sensor senses the adapter sensing signal of the logic value corresponding to the fact that the adapter supplies electrical power therethrough.

BRIEF DESCRIPTION OF THE DRAWINGS

The above and/or other aspects and advantages of the present invention will become apparent and more readily appreciated from the following description of the embodiments, taken in conjunction with the accompanying drawings of which:

FIG. 3 shows structures of a control power on/off circuit and a power selector according to an embodiment of the electronic device in FIG. 1;

DETAILED DESCRIPTION OF THE EMBODIMENTS

Figure 1:
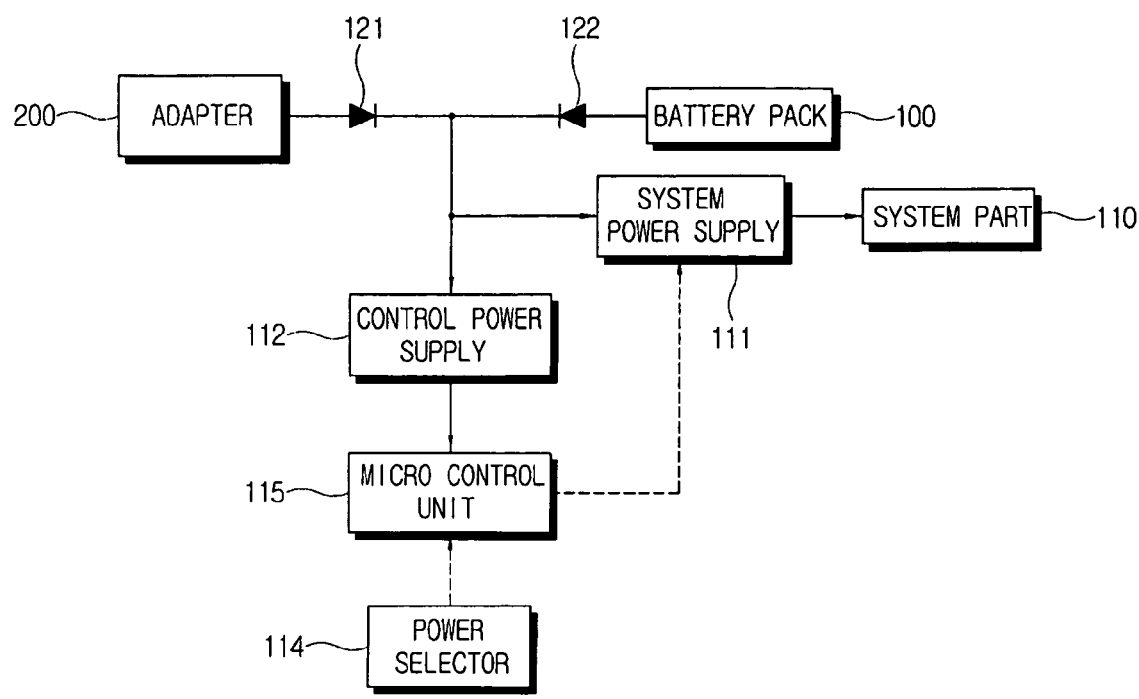
FIG. 1 is a control block diagram of a conventional electronic device.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
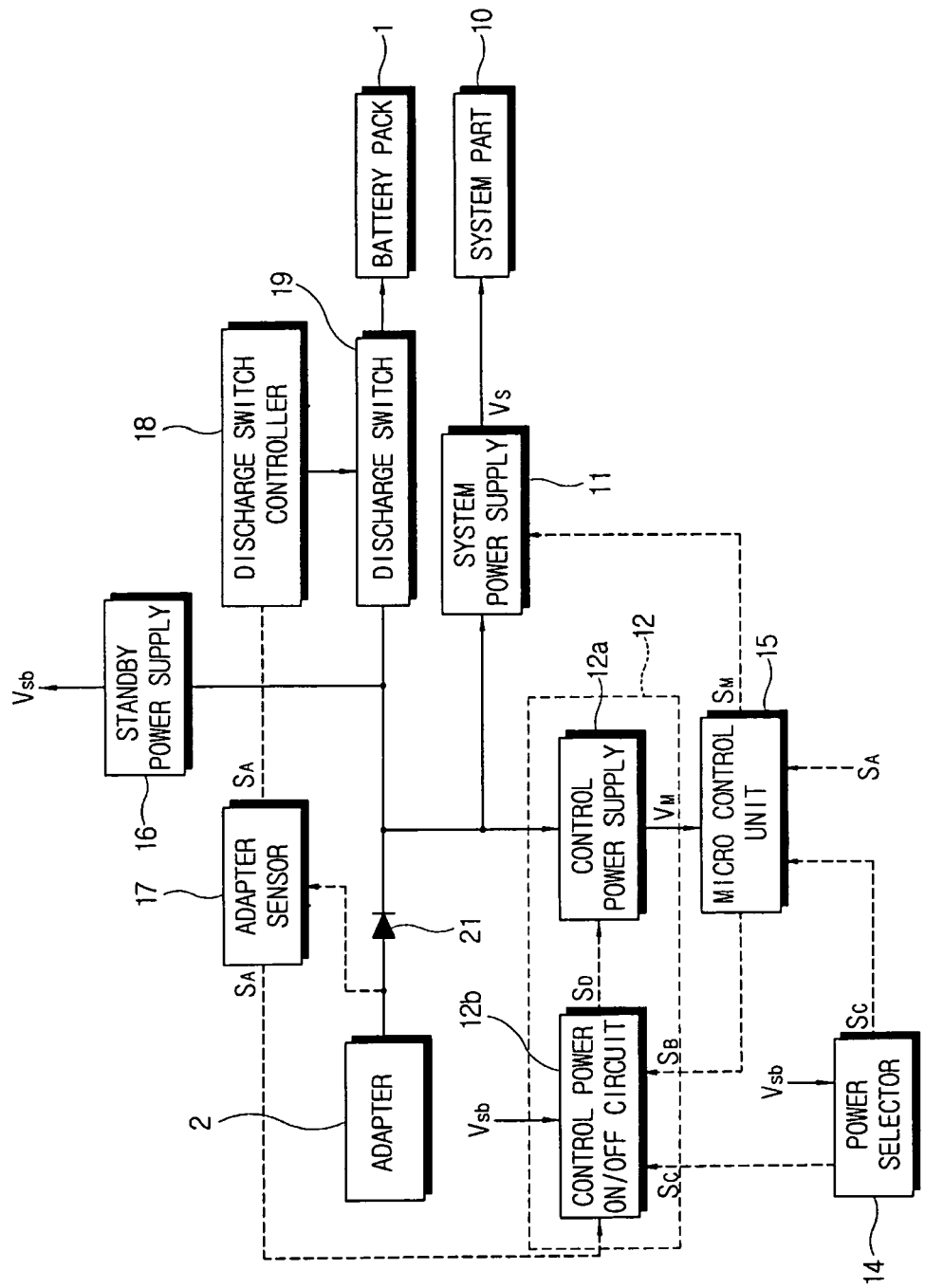
FIG. 2 is a control block diagram of an electronic device according to an embodiment of the present invention.

FIG. 2 is a control block diagram of an electronic device according to an embodiment of the present invention. The shown electronic device has a system part 10, a battery pack

1, a system power supply 11, a power selector 14, a micro control unit (MCU) 15 and an MCU power controller 12.

The battery pack 1 supplies electrical power required for the electronic device to the system power supply 11. While not required, the battery pack 1 may be detachably provided in a system and a secondary battery recharged by a charger (not shown). Alternately, it is understood that the battery pack 1 can be an internal power supply that is not detachable.

The system part 10 comprises a plurality of electronic components to operate a main function of the electronic device according to an embodiment of the present invention. For example, if the electronic device according to an embodiment of the present invention is a portable computer, the system part 10 may comprise a central processing unit (CPU), a system memory such as a random access memory (RAM), a graphic card, a main board and the like. To operate the system part 10, system operating power Vs is supplied from the system power supply 11. However, it is understood that the system part 10 could be for other electrical devices, such as personal digital assistants, optical disc players, stereos, digital cameras, or other electrically powered devices.

The system power supply 11 outputs the system operating power Vs by transforming electrical power supplied from the battery pack 1 into the system operating power to operate the system part 10. The system power supply 11 supplies/cuts the system operating power Vs supplied to the system part 10 according to a control of the micro control unit 15.

The power selector 14 outputs a system power selecting signal Sc according to an operation of a user. By way of example, according to an aspect of the invention, if the user pushes a power switch (not shown), the power selector 14 according to an embodiment of the present invention outputs a system power selecting signal Sc of a logic '0'. However, if the user no longer presses the power switch, the power selector 14 outputs a system power selecting signal Sc of the logic value '1'.

In order to control whether the system power supply 11 outputs the system operating power Vs, the micro control unit 15 transmits a system operating signal Sm to the system power supply 11. To operate the micro control unit 15, a control power supply 12a supplies a control electrical power Vm. If the micro control unit 15 is turned off (that is, the control power supply 12a cuts the control power Vm), the system power supply 11 cuts the system operating power Vs. Thus, if the micro control unit 15 is turned off, the electronic device is also turned off.

The micro control unit 15 transmits a latch signal Sb to the control power on/off circuit 12b. The latch signal Sb will be detailed described later.

The MCU power controller 12 controls the micro control unit 15 to be turned on/off by determining whether a control power Vm to turn the micro control unit 15 on is supplied, based on the system power selecting signal Sc transmitted from the power selector 14. In the shown embodiment, the MCU power controller 12 comprises the control power supply 12a to output the control power Vm by being supplied with electrical power from the battery pack 1. The MCU power controller 12 further includes the control power on/off circuit 12b that controls whether the control power supply 12a supplies the control power Vm, based on the system power selecting signal Sc transmitted from the power supply 14.

The control power supply 12a outputs the control power Vm by transforming the power supplied from the battery pack 1 into the control power Vm operating the micro control unit 15. The control power supply 12a determines whether the control power Vm is output according to a control power selecting signal Sd transmitted from the control power on/off circuit 12b. While not required in all aspects of the invention, the control power supply 12a shown in FIG. 3 is a low dropout regulator integrated circuit (LDO IC). An example of the LDO IC is the MIC 5236 produced by MICREL INC. In the LDO IC(MIC 5236), if a signal of the logic value '1' is transmitted to an enable terminal EN, an inputted voltage V1 supplied to an input terminal IN is converted into a predetermined voltage Vm and supplied through an output terminal OUT. Thus, the electrical power from the battery pack 1 is input through the input terminal IN of the LDO IC (such as the MIC 5236), and is supplied through the output terminal OUT by being converted corresponding to an operating voltage Vm of the micro control unit 15.

The control power on/off circuit 12b controls the micro control unit 15 to be turned on/off by transmitting the control power selecting signal Sd to the control power supply 12a and thereby controlling whether the control power supply 12a supplies the control power Vm. The control power on/off circuit 12b according to the shown embodiment of the present invention outputs a control power selecting signal Sd of the logic value '1' to make the control power supply 12a supply the control power Vm and a control power selecting signal Sd of logic '0' to make the control power supply 12a cut the control power Vm.

While not required in all aspects, the electronic device according to the shown embodiment of the present invention further comprises an adapter 2 to convert commercial alternating current from the outside into direct current. Thus, the system power supply 11 can output the system operating power Vs supplied from one of the adapter 2 and the battery pack 1. Also the control power supply 12a can supply the control power Vm to the micro control unit 15 supplied from one of the adapter 2 and the battery pack 1.

While not required in all aspects, the electronic device according to the shown embodiment of the present invention further comprises an adapter sensor 17 to sense whether the electrical power is supplied from the adapter 2. The adapter sensor 17 outputs an adapter sensing signal Sa having a logical value corresponding to whether the electrical power is supplied from the adapter 2. The adapter sensing signal Sa output from the adapter sensor 17 is transmitted to the control power on/off circuit 12b and the micro control unit 15. If an adapter sensing signal Sa corresponding to a supply of power from the adapter 2 is sensed, the control power on/off circuit 12b controls the control power supply 12a so that the micro control unit 15 remains turned on. The micro control unit 15 determines whether the adapter 2 is mounted according to the adapter sensing signal Sa.

In the adapter sensor 17 according to the shown embodiment of the present invention, if it is sensed that the adapter 2 supplies electrical power therethrough, the adapter sensor 17 outputs an adapter sensing signal Sa of a logical value '1'. If it is sensed that the adapter does not supply electrical power therethrough, the adapter sensor 17 outputs an adapter sensing signal Sa of a the logic value '0'. However, it is understood that other logical valves can be used for the signals Sa, Sb, and Sc.

The electronic device according to the shown embodiment of the present invention includes a discharge switch 19. The discharge switch 19 is turned on/off to supply/cut electrical power from the battery pack 1 to the system power supply 11 and the control power supply 12a and a discharge switch controller 18 controlling the discharge switch 19 to be turned on/off according to the adapter sensing signal Sa transmitted from the adapter sensor 17. If an adapter signal Sa of the logical value of '1' is sensed, the discharge switch controller 18 controls the discharge switch 19 to be turned off, thereby cutting electrical power supplied from the battery pack 1 to the system power supply 11 and the control power supply 12a. Thus, if the adapter 2 supplies electrical power therethrough, the battery pack 1 need not to be used, thereby prolonging a use time of the battery pack 1. However, the discharge switch 19 and/or the discharge switch controller 18 need not be used in all aspects of the invention.

The electronic device according to the shown embodiment of the present invention further comprises a standby power supply 16 supplying standby power Vsb by transforming the electrical power supplied from the battery pack 1 or the adapter 2 into the standby power Vsb to operate the control power on/off circuit 12b and the power selector 14. Thus, the control power on/off circuit 12b and the power selector 14 can be kept always in a state of being turned on. Therefore, the power selector 14 can output the system power selecting signal Sc, according to an external operation of the user and the control power on/off circuit 12b can output the control power selecting signal Sd by sensing the system power selecting signal Sc, the adapter sensing signal Sa and the like. Here, the standby power supply 16 is preferably an LDO IC such as the MAX 1615 supplied by MAXIM INTEGRATED PRODUCTS. However, it is understood that the standby power supply 16 and the standby power Vsb need not be used in all aspects of the invention.

In the shown embodiment, if the discharge switch controller 18 turns the discharge switch 19 off, electrical power otherwise supplied from the battery pack 1 to the standby power supply 16 is preferably cut. Thus, if the adapter 2 supplies electrical power required for the electronic device therethrough, the adapter 2 supplies the standby power Vsb required to operate the control power on/off circuit 12b and the power selector 14, thereby minimizing use of the battery pack 1.

Hereinbelow, the control power on/off circuit 12b and the power selector 14 according to the shown embodiment of the present invention will be detailed described, with refer to FIG. 3. The control power on/off circuit 12b comprises a logical operation circuit 12b' logically operating the system power selecting signal Sc transmitted from the power selector 14, the latch signal Sb transmitted from the micro control unit 15, and the adapter sensing signal Sa transmitted from the adapter sensor 17. The logical operation circuit 12b' logically operates the system power selecting signal Sc, the latch signal Sb, and the adapter sensing signal Sa and outputs the control power selecting signal Sd to control whether the control power Vm of the control power supply 12a is supplied. In the logical operation circuit 12b' according to the shown embodiment of the present invention, if the adapter sensing signal Sa is high or one of the system power selecting signal Sc and the latch signal Sb is low, the logical operation circuit 12b' outputs a control power selecting signal Sd of the logic value '1'. The logical operation circuit 12b' according to the shown embodiment of the present invention comprises a NOT-gate N1 to reverse the logic value of the latch signal Sb, an OR-gate U1 logically summing a signal output from the NOT-gate N1 and the adapter sensing signal Sa and outputting the logical sum, a NOT-gate N2 reversing a logical value of the system power selecting signal Sc and an OR-gate U2 logically summing signals transmitted from the OR-gate U1 and the NOT-gate N2 and outputting the logical sum. However, it is understood that the logical elements can be otherwise arranged.

As shown in FIG. 3, the power selector 14 comprises a first signal delay circuit 14b delaying an output of the system power selecting signal Sc of the logic value '1' after the operation of the user is removed. The shown first signal delay circuit 14b comprises a resistor R1, a condenser (i.e., a capacitor) C1 and a diode D1. The resistor R1 and the condenser C1 delay the system power selecting signal Sc of the logic value '0' generated when the user pushes the power switch (not shown) to be changed into the system power selecting signal Sc of the logic value '1' generated when the user removes his hand from the switch not shown. The diode D1 prevents a current from flowing reversed. However, the first delay circuit 14b can be otherwise configured.

In the shown embodiment, the control power on/off circuit 12b comprises a second signal delay circuit 12b″ delaying the output of the control power selecting signal Sd of the logic value '1', after the detection of the system power selecting signal Sc of the logic value '0'. The shown second signal delay circuit 12b″ comprises a resistor R2, a condenser (i.e., a capacitor) C2 and a diode D2, but may be otherwise configured. The resistor R1 and a condenser (i.e., a capacitor) C1 delay the control power selecting signal Sd of the logic value '0' to be changed into the control power selecting signal Sd of the logic value '1' and the diode D1 prevents a current from flowing reversed. Thus, the control power on/off circuit 12b outputs a control power selecting signal Sd of the logic value '1', if the sum of a time for operating the power selector 14 of the user plus a time delayed by the first signal delay circuit 14b is longer than a time delayed by the second signal delay circuit 12b″. However, it is understood that the second signal delay circuit 12b″ and/or the first signal delay circuit 14b need not be used in all aspects of the invention.

Figure 4A:
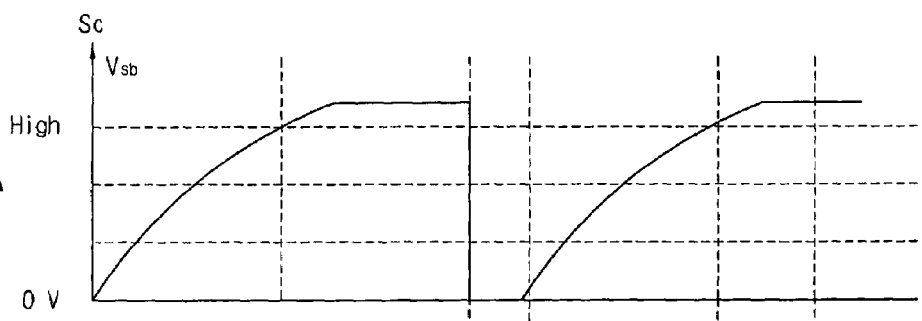
FIGS. 4A through 4D show the relationship between a system power selecting signal and a control power selecting signal according to an embodiment of the present invention.
Figure 4B:
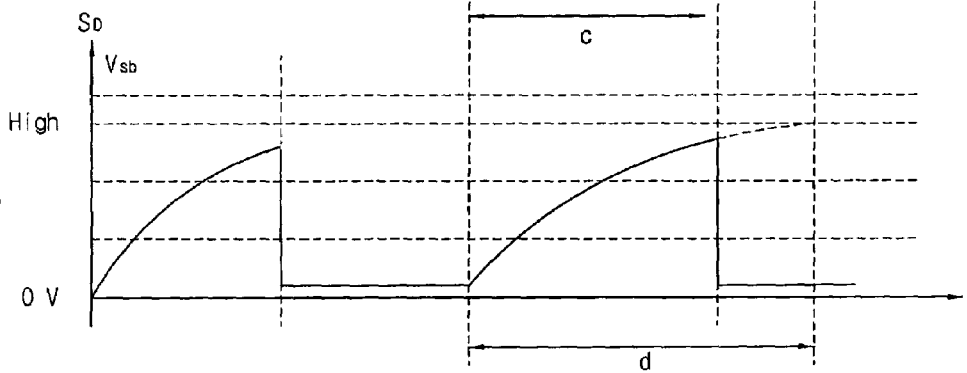
Figures 4C, 4D:
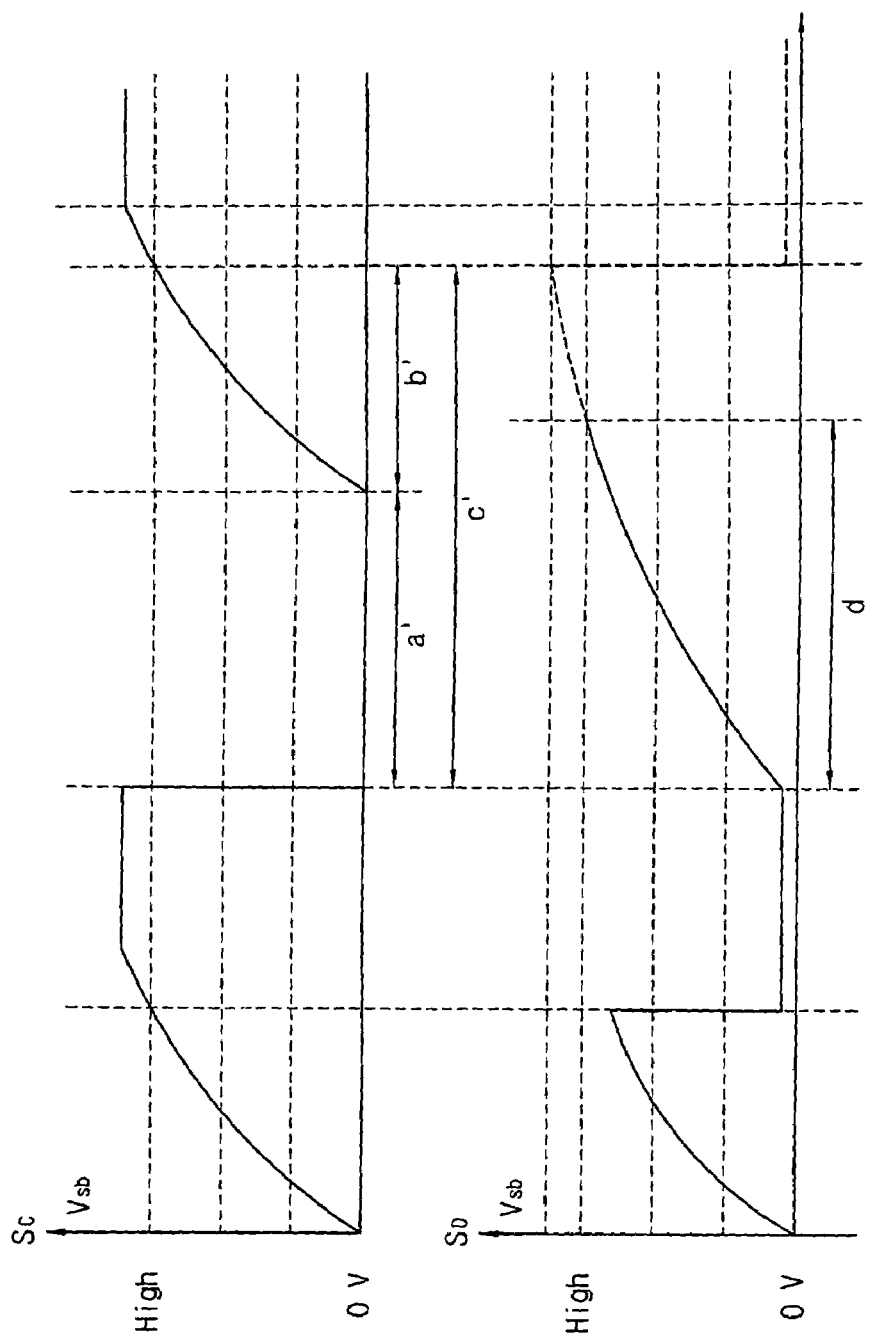

FIGS. 4A and 4B shows changes in the logic values of the system power selecting signal Sc and the control power selecting signal Sd relative to time, if the sum of the time for operating the power selector 14 of the user plus the time delayed by the first signal delay circuit 12b' is shorter than the time delayed by the second signal delay circuit 12b″. As shown herein, if the logic value of the system power selecting signal Sc is dropped to '0' corresponding to the operation of the user, the logic value of the control power selecting signal Sd is slowly increased to '1' by the second signal delay circuit 12b″. Then, if the operation of the user is removed, the logic value of the system power selecting signal Sc is slowly increased to '1' by the first signal delay circuit 12b'. However, until the logic value reaches a critical point at which the logic value is recognized as '1', the logic value is recognized as '0', so that the control power selecting signal Sd is continuously increased to the logic value of '1'. If the time b that can be delayed by first signal delay circuit 12b' is over and the system power selecting signal Sc is already changed into the logic value of '1', but the time d delayed by the second signal delay circuit 12b″ is not yet over, the logic value of control power selecting signal Sd cannot be changed into '1' and is decreased to '0', so that the logic value is kept as '0'. Thus, if the logic value of a switching on/off signal is changed into '0', the logic value of the control power on/off circuit 12b does not change the logic value of the control power selecting signal Sd into '1'. In contrast thereto, as shown in FIGS. 4C and 4D, if the user operates the power selector 14 for a sufficient period of time a', the time b' for changing the logic value of '0' into the logic value of '1', (i.e., the sum c' of the time a' for operating the power selector 14 of the user plus the time b' delayed by the first signal delay circuit 14b) is longer than the time d delayed by the second signal delay circuit 12b". Thus, the control power on/off circuit 12b outputs the control power selecting signal Sd of the logic value '1'.

The electronic device according to an embodiment of the present invention is turned on/off as follows referring to FIGS. 5 through 8. Here, if the electrical power of the electrical power is supplied from the battery pack 1, it is defined as a battery mode, and if the electrical power is supplied from the adapter 2, it is defined as an adapter mode.

Figure 5:
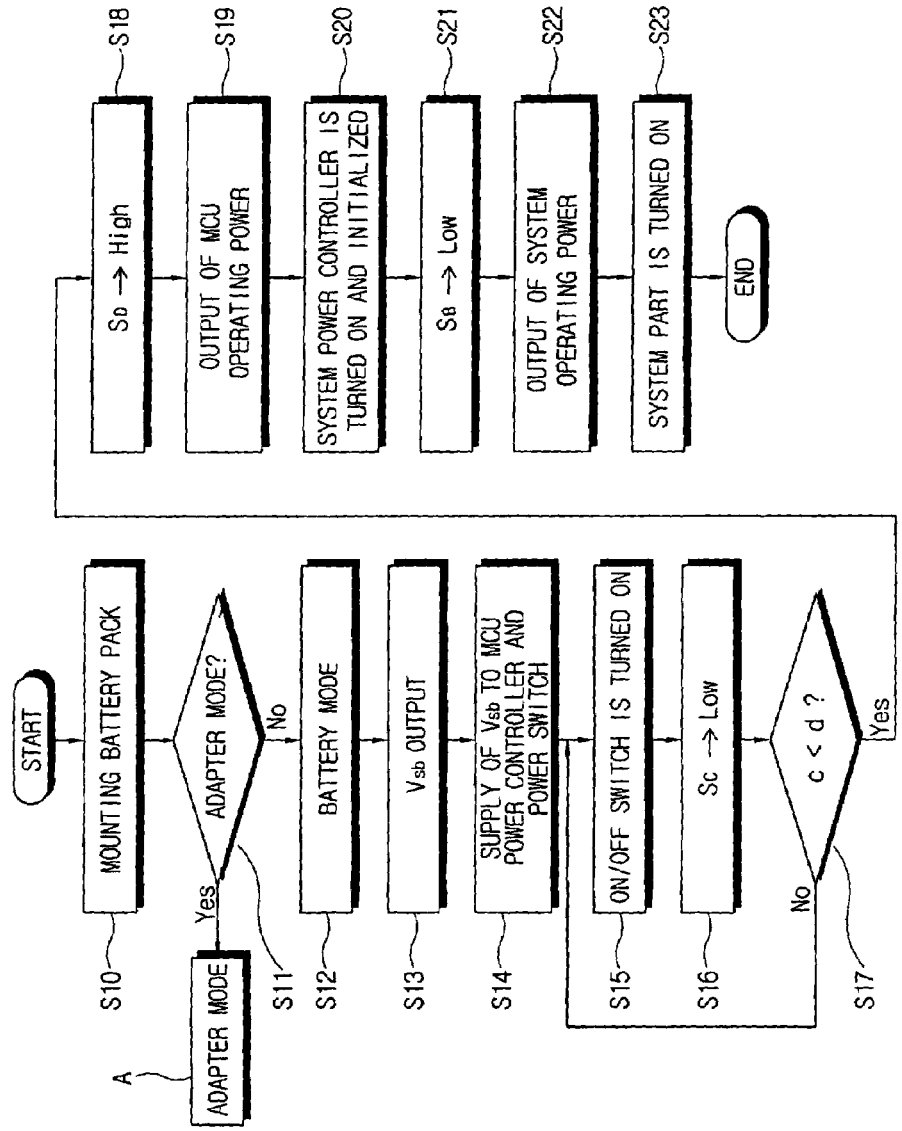
FIG. 5 is a control flow chart showing how the electronic device according to an embodiment of the present invention is turned on in a battery mode.

First, it is described how the electronic device is turned on in the battery mode, with refer to FIG. 5. If the user mounts the battery pack 1 on the electronic device at operation S10, it is determined whether electrical power is supplied from the battery pack 1 according to whether the mode is an adapter mode at operation S11. As described above, if electrical power is supplied from the adapter 2, the discharge switching controller 18 turns the discharge switch 19 off and cuts the electrical power supplied from the battery pack 1, so that electrical power is not supplied from the battery pack 1, which means the electronic device is operated in the adapter mode.

In contrast thereto, if electrical power is not supplied from the adapter 2, (i.e., the discharge switch 19 is turned on and the mode is a battery mode) at operation S12, the mounted battery pack 1 supplies electrical power to the system power supply 11, the control power supply 12a and the standby power supply 16. Then, the standby power supply 16 (to which electrical power is supplied from the battery pack 1) outputs the standby power Vsb at operation S13. The output standby power Vsb is supplied to the control power on/off circuit 12b and the power selector 14 at operation S14. Thus, the control power on/off circuit 12b and the power selector 14 are turned on and are kept in a state to be operated.

Here, if the user operates the power selector 14 at operation S15, the power selector 14 outputs the system power selecting signal Sc of the logic value '0' at operation S16 and the system power selecting signal Sc of the logic value '0' output from the power selector 14 is input in the control power on/off circuit 12b. At this time, the adapter sensor 17 outputs the adapter sensing signal Sa of the logic value '0', as the adapter 2 does not supply electric power. Here, the latch signal Sb from the micro control unit 15 is recognized as the logic value of '1'. Thus, the control power selecting signal Sd output from the control power on/off circuit 12b is determined according to the logic value of the system power selecting signal Sc.

Here, the control power on/off circuit 12b compares the sum of the time for operating the power selector 14 of the user and the time delayed by the first signal delay circuit 14b to the time delayed by the second signal delay circuit 12b" at operation S17. Then, if the sum of the time for operating the power selector 14 of the user and the time delayed by the first signal delay circuit 14b is longer than the time delayed by the second signal delay circuit 12b", the control power on/off circuit 12b turns the control power selecting signal Sd of the logic value of '0' into that of the logic value '1' and outputs the control power selecting signal Sd of the logic value '1' at operation S18. If the sum of the time for operating the power selector 14 of the user and the time delayed by the first signal delay circuit 14b is shorter than the time delayed by the second signal delay circuit 12b", the control power on/off circuit 12b keeps the logic value of the control power selecting signal Sd as '0'.

If the control power selecting signal Sd of the logic value '1' is output from the control power on/off circuit 12b, the control power supply 12a outputs the control power Vm to the micro control unit 15 at operation S19. The micro control unit 15 is turned on by the control power Vm and initialized at operation S20. When the micro control unit 15 is initialized, the micro control unit 15 uses the system control signal Sm to control the system power supply 11 to supply the system operating power Vs to the system part 10 at operation S22.

The micro control unit 15 turns the electronic device on at operation S23. Further, when the micro control unit 15 is initialized, the micro control unit 15 transmits the latch signal Sb of the logic value '0' to the control power on/off circuit 12b at operation S21. The control power on/off circuit 12b keeps the logic value of the control power selecting signal Sd as '1' to control the control power Vm by the latch signal Sb having the logic value '0'. Thus, if the logic value of the system power selecting signal Sc is turned into '1' as the user removes operation of the power selector 14, the control power selecting signal Sd is kept as the logic value of '1'.

Figure 6:
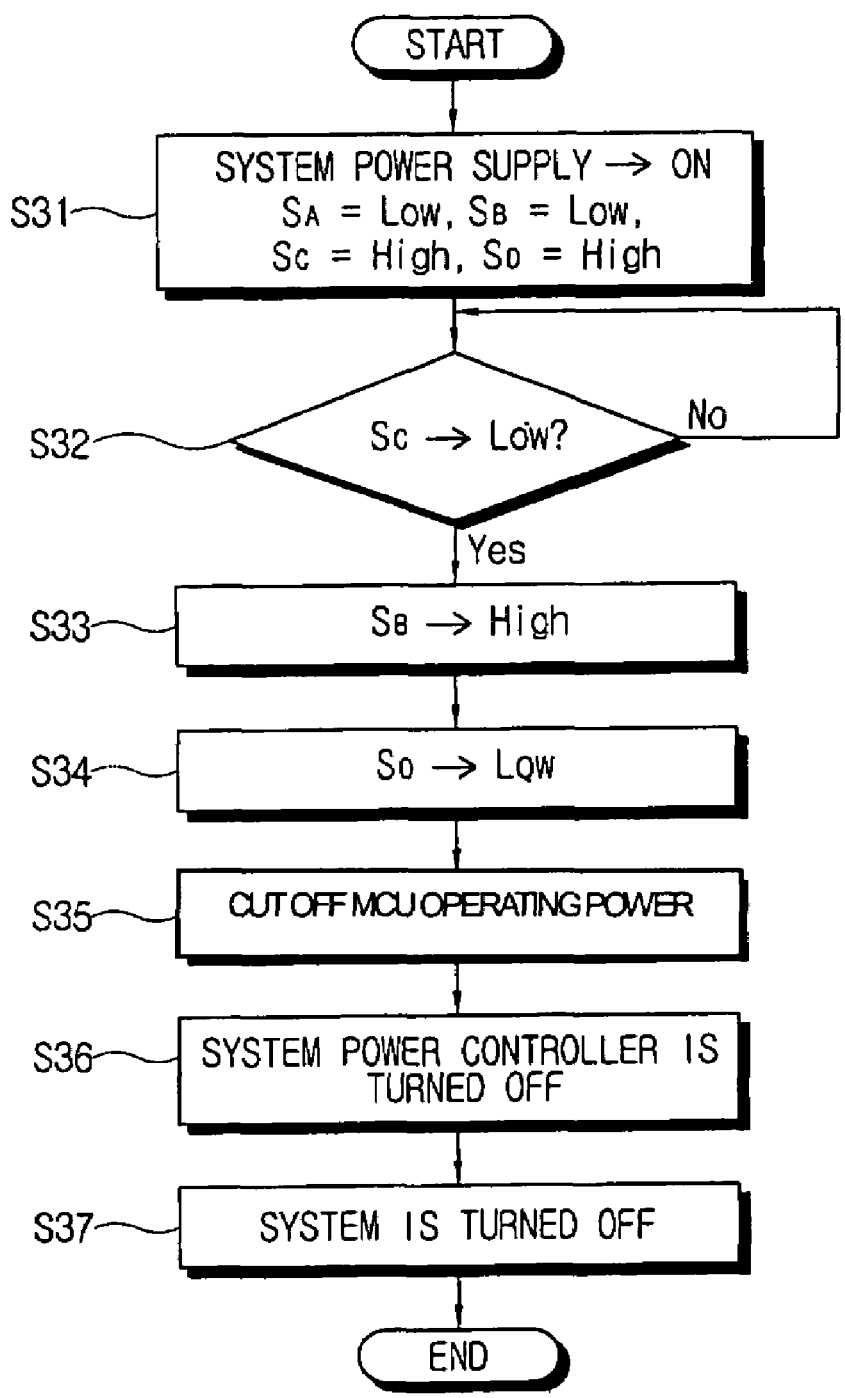
FIG. 6 a control flow chart showing how the electronic device according to an embodiment of the present invention is turned off in a battery mode.

The electronic device is turned off in the battery mode as follows in reference to FIG. 6. First, if the electronic device is turned on in the battery mode, the adapter sensing signal Sa transmitted from the control power on/off circuit 12b is of the logic value '0', the system power selecting signal Sc is of the logic value '1', the latch signal Sb is of the logic value '0' and the control power selecting signal Sd is of the logic value '1'. That is, the control power selecting signal Sd keeps the logic value as '1' by the latch signal Sb at operation S31.

If the user operates the power selector 14 to turn the electronic device off, the power selector 14 turns the system power selecting signal Sc of the logic value '1' into the system power selecting signal Sc of the logic value '0', and the output system power selecting signal Sc has the logic value '0' at operation S32. Then, the micro control unit 15 senses the system power selecting signal Sc turned into the logic value '0' to turn the latch signal Sb of the logic value '0' into the latch signal Sb of the logic value '1' at operation S33. The control power on/off circuit 12b senses the latch signal Sb turned into the logic value '1' and the system power selecting signal Sc turned into the logic value '0'. Here, if the system power selecting signal Sc of the logic value '0' is turned into the system power selecting signal Sc of the logic value '1' as the operation of the power selector 14 by the user is removed, the control power on/off circuit 12b turns the control power selecting signal Sd of the logic value '1' into the control power selecting signal Sd of the logic value '0' and outputs the control power selecting signal Sd of the logic value '0' at operation S34.

Thereafter, if the control power selecting signal Sd of the logic value '0' is transmitted to the control power supply 12a, the control power supply 12a cuts the control power Vm supplied to the micro control unit 15 at operation S35. The micro control unit 15 is turned off at operation S36. Then, the system power supply 11 cuts the system operating power Vs supplied to the system part 10 as the micro control unit 15 is turned off and turns the system part 10 off at operation S37.

The electronic device is turned on in the adapter mode as follows referring to FIG. 7. First, the user mounts the adapter 2 on the electronic device at operation S40. If electrical power is supplied from the adapter 2, the adapter sensor 17 senses that electrical power is supplied from the adapter 2 and outputs the adapter sensing signal Sa of the logic value '1' at operation S41. Then, the discharge switch controller 18 senses the adapter sensing signal Sa of the logic value '1' output from the adapter sensor 17 and the turns the discharge switch 19 off at operation S41. Thus, if electrical power is supplied from the adapter 2 in the battery mode, electrical power from the battery pack 1 is cut, so that use of the battery pack 1 is cut. If the user mounts the battery pack 1 in the adapter mode, use of the battery pack 1 is cut. Electrical power supplied from the adapter 2 is supplied to the standby power supply 16 and the standby power supply 16 supplies the standby power Vsb to the control power on/off circuit 12b and the power selector 14 at operations S42 and S43. Then, the control power on/off circuit 12b senses the adapter sensing signal SA of the logic value '1' and outputs the control power selecting signal Sd of the logic value '1' at operation S44. Here, the latch signal Sb transmitted to the control power on/off circuit 12b may be of the logic value '0' or '1'. Thereafter, the control power supply 12a outputs the control power selecting signal Sd to the micro control unit 15 corresponding to the control power selecting signal Sd of the logic value '1' transmitted from the control power on/off circuit 12b at operation S45, so that the micro control unit 15 is turned on and initialized according to the control power Vm at operation S46.

Here, the micro control unit 15 recognizes that the mode is the adapter mode due to the adapter sensing signal Sa of the logic value '1' transmitted from the adapter sensor 17 and outputs the latch signal Sb of the logic value '1' at operation S47. Thus, to the control power on/off circuit 12b are transmitted the adapter sensing signal Sa of the logic value '1', the latch signal Sb of the logic value '1', and the system power selecting signal of the logic value '1'. Accordingly, the control power selecting signal Sd output from the control power on/off circuit 12b keeps the logic value as '1' due to the adapter sensing signal Sa of the logic value '1', without regard to the logic value of the latch signal Sb or the system power selecting signal Sc, so that the micro control unit 15 remains turned on in the adapter mode.

Figure 7:
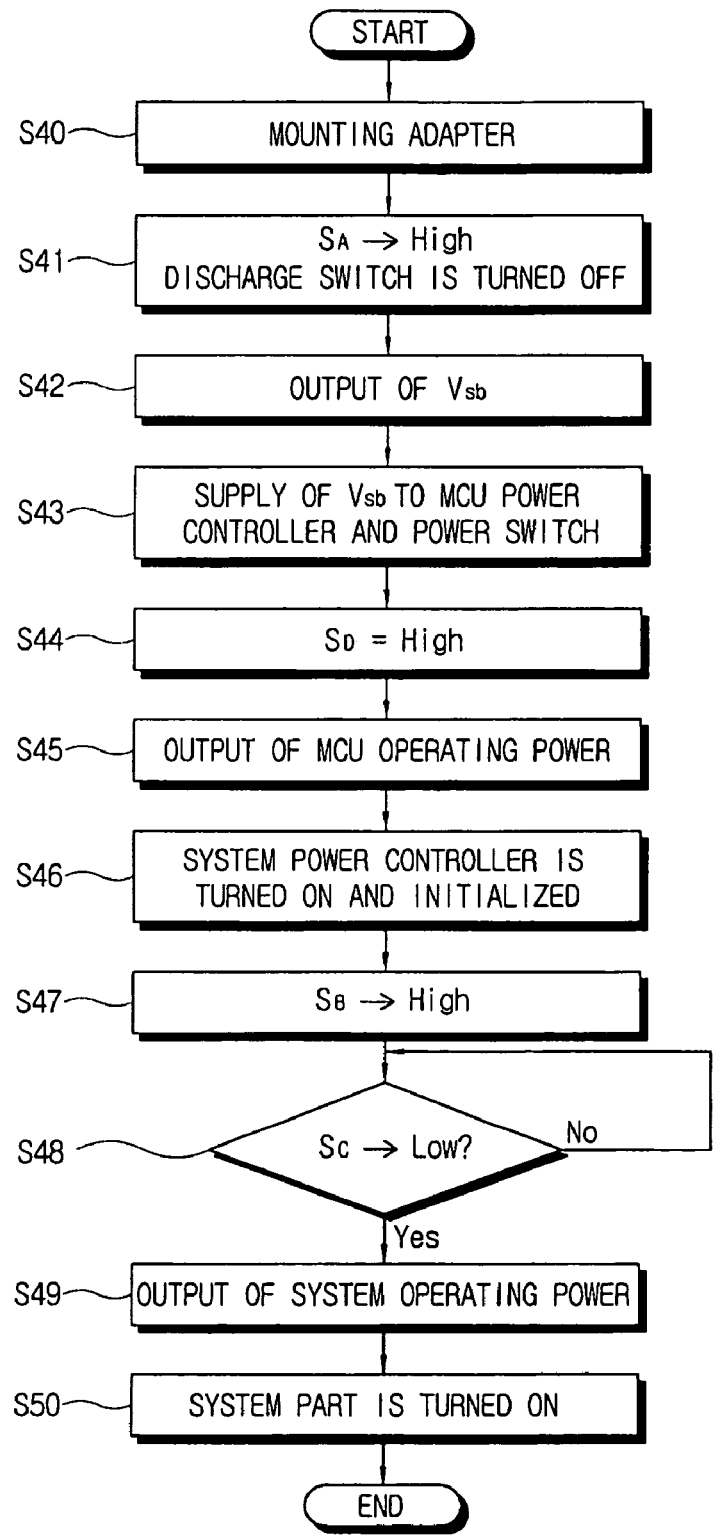
FIG. 7 is a control flow chart showing how the electronic device according to an embodiment of the present invention is turned on in an adapter mode.
Figure 8:
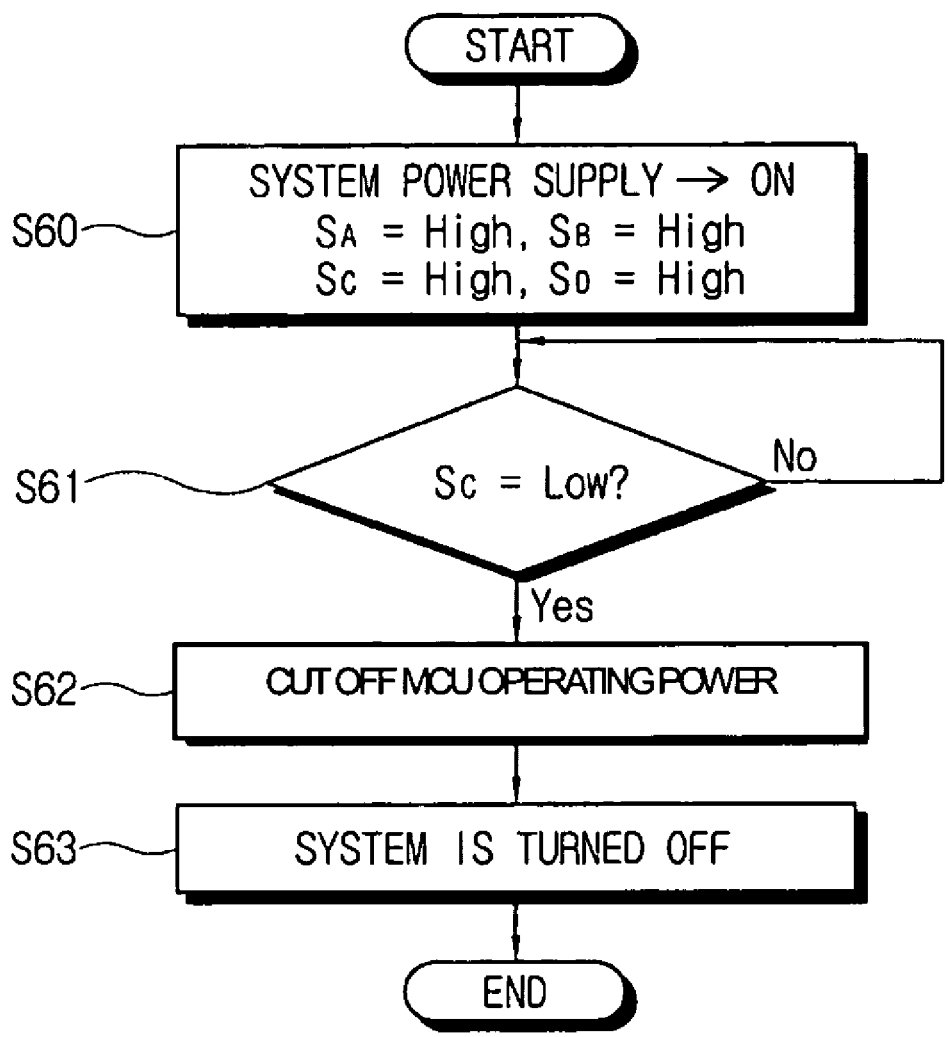
FIG. 8 is a control flow chart showing how the electronic device according to an embodiment of the present invention is turned off in an adapter mode.

The electronic device is turned on/off in the adapter mode as shown in FIGS. 7 and 8. The micro control unit 15 senses the system power selecting signal Sc turned into the logic value of '0' according to the operation of the power selector 14 by the user and controls the system power supply 11 to supply/cut the system operating power Vs. As described above, in the adapter mode, the system power selecting signal Sc transmitted to the control on/off circuit 12b has no effect on the logic value of the control power Vm supplied from the control on/off circuit 12b. Thus, the micro control unit 15 senses the system power selecting signal Sc and determines whether the electronic device is turned on/off. For example, if the electronic device is turned off and it is sensed that the system power selecting signal Sc is turned into the logic signal of '0' (refer to S48 in FIG. 7), the micro control unit 15 turns the electronic device on (refer to S49 and S50 in FIG. 7). If the electronic device is turned on and it is sensed that the system power selecting signal Sc is turned into the logic signal of '0' (refer to S61 in FIG. 8), the micro control unit 15 turns the electronic device off (refer to S62 and S63 in FIG. 8). However, it is understood that the micro control unit 15 need not be maintained on when the adapter 2 is connected in all aspects of the invention so as to allow reduced power consumption even when the adapter mode is utilized.

Figure 9:
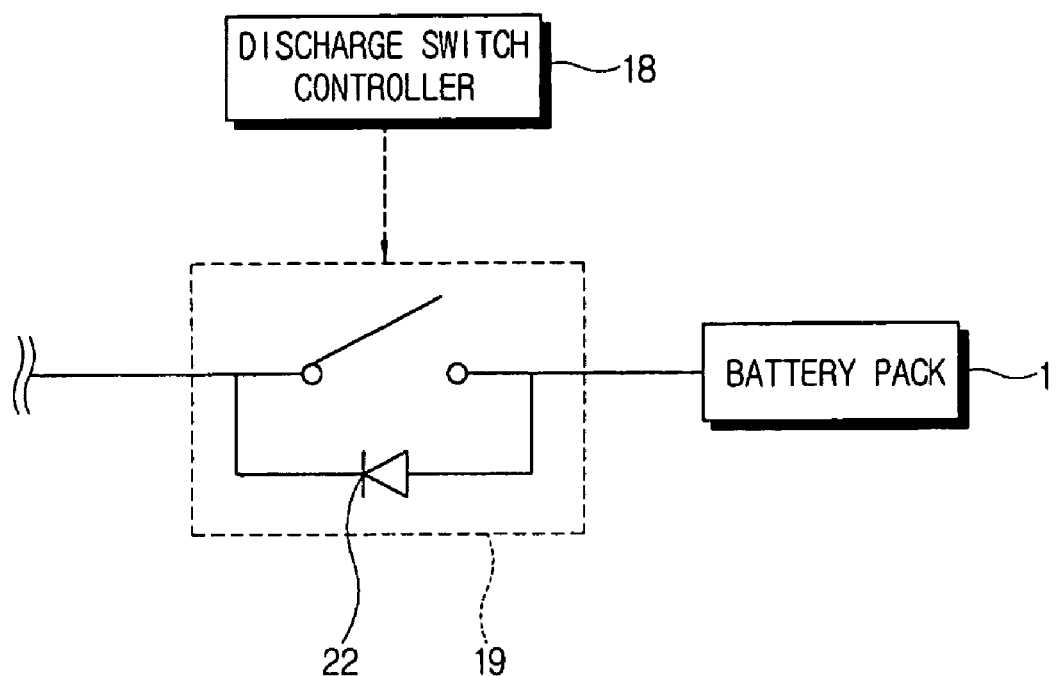
FIG. 9 is a view showing an example of a discharge switch according to an embodiment of the present invention.

While not required in all aspects of the invention, the shown electronic device includes diodes 21 and 22 to prevent currents of the adapter 2 and the battery pack 1 from flowing reversed (refer to FIGS. 2 and 9). Here, the diode 22 to prevent the current of the battery pack 1 from flowing reversed may be provided as a component of the discharge switch 19.

The logic value of each of the system power selecting signal Sc, the latch signal Sb, the adapter sensing signal Sa and the control power selecting signal Sd may be defined differently from that in the embodiment described above. For example, the power selector 14 may output a power selecting signal Sd of the logic value of '1' corresponding to the operation of the power selector 14 by the user. Accordingly, the control power on/off circuit 12b may output the control power selecting signal Sd of the logic value '1', if the system power selecting signal Sc is of the logic value '1'.

In the embodiment described above and FIG. 2, the battery pack 1 and the adapter 2 supply electrical power to the electronic device according to the embodiment of the present invention. However, it is understood that the adapter 2, the adapter sensor 17 to sense the adapter 2, the discharge switch controller 18, and/or the discharge switch 19 need not be used in all aspects of the invention.

Further, in the embodiment described in FIG. 2, the battery pack 1 or the adapter 2 supplies electrical power to the standby power supply 16. However, in the embodiment shown in FIG. 10, an auxiliary battery 1a supplies electrical power to the standby power supply 16. If the electronic device according to the embodiment of the present invention is a portable computer, an embodiment of the auxiliary battery 1a includes a bridge battery used for complementary metal oxide semiconductor (CMOS) and preventing the RAM to be discharged and data to be lost when the battery pack 1 is changed at the standby mode.

Figure 10:
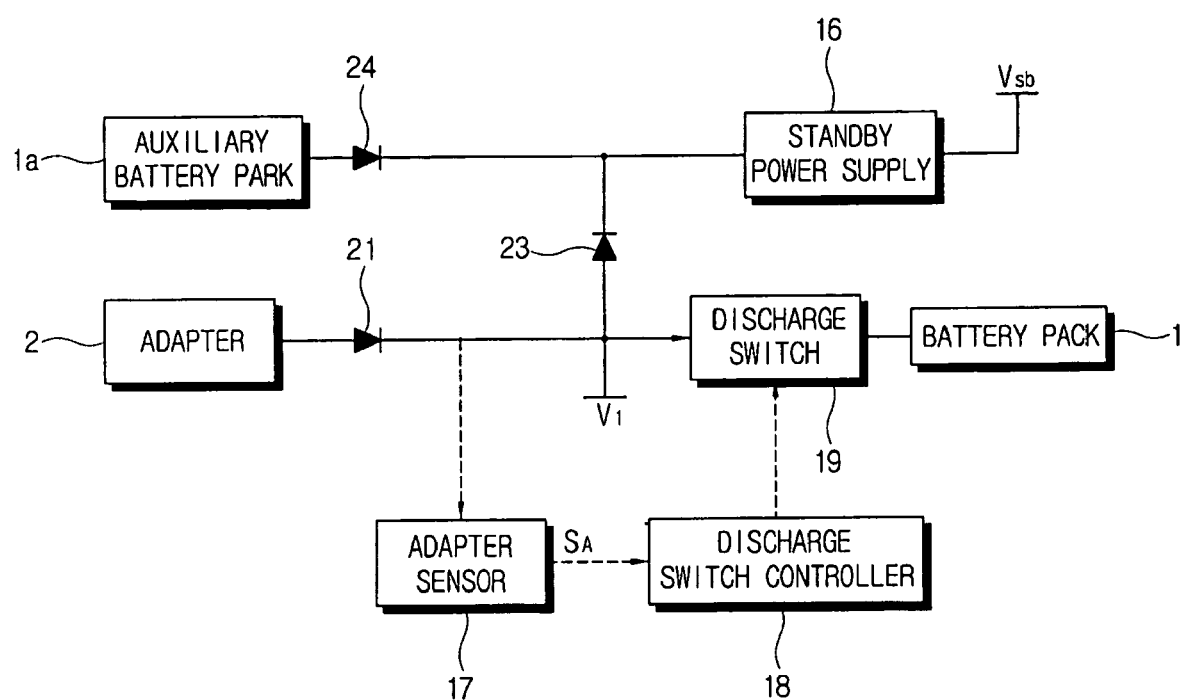
FIG. 10 is a part of a control block diagram of the electronic device mounted with an auxiliary battery according to an embodiment of the present invention.

Also shown in FIG. 10 are diodes 23,24 to prevent currents from flowing reversed.

As described above, an aspect of the present invention provides the electronic device in which electrical power required to operate the power supply system of the electronic device is minimized and the use time of the battery pack is prolonged.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An electronic device comprising:
    a system part to provide a function of the electrical device if an operating power is supplied to the system part;
    a control unit which, if the control unit is turned on, controls whether the operating power is received by the system part;
    a power controller which selectively turns on the control unit to allow the control unit to provide the operating power and turns off the control unit to prevent the control unit from providing the operating power; and
    a power selector which outputs a power select signal received at the power controller according to an operation of a user in order to turn on the power controller so as to turn on the control unit,
    wherein the power controller comprises a control power circuit which controls whether a control power supply outputs a control power so as to control the control unit based on a power select signal.

2. The electronic device of claim 1, further comprising a system power supply which supplies the operating power to the system part under the control of the control unit, wherein the supplied operating power is from a battery connected to the electronic device and supplied through the system power supply.

3. The electronic device of claim 2, wherein the battery comprises a battery pack detachably connected to the electronic device.

4. The electronic device of claim 1, further comprising a system power supply that transforms supplied electrical power into the operating power to operate the system part, and the control unit controls the system power supply in order to control whether the operating power is received at the system part.

5. An electronic device comprising:
a system part to provide a function of the electrical device if an operating power is supplied to the system part;
a control unit which, if the control unit is turned on, controls whether the operating power is received by the system part;
a power controller which selectively turns on the control unit to allow the control unit to provide the operating power and turns off the control unit to prevent the control unit from providing the operating; and
a power selector which outputs a power select signal received at the power controller according to an operation of a user in order to turn on the power controller so as to turn on the control unit,
wherein the power controller comprises
a control power supply which selectively outputs a control power signal to the control unit in order to control the control unit to be one of turned on and turned off, and
a control power circuit which controls whether the control power supply outputs the control power so as to control the control unit based on a power select signal.

6. The electronic device of claim 5, further comprising a system power supply that transforms supplied electrical power into the operating power to operate the system part, and the control unit controls the system power supply in order to control whether the operating power is received at the system part.

7. The electronic device of claim 6, wherein the control unit controls the system power supply to output the operating power if the control power supply supplies the control power.

8. An electronic device comprising:
a system part to provide a function of the electrical device if an operating power is supplied to the system part;
a control unit which, if the control unit is turned on, controls whether the operating power is received by the system part;
a power controller which selectively turns on the control unit to allow the control unit to provide the operating power and turns off the control unit to prevent the control unit from providing the operating power; and
a standby power supply which supplies standby power to the control power circuit such that the control power circuit senses the power select signal when the control unit is turned off,
wherein the power controller comprises
a control power supply which selectively outputs a control power signal to the control unit in order to control the control unit to be one of turned on and turned off, and
a control power circuit which controls whether the control power supply outputs the control power so as to control the control unit based on a power select signal.

9. The electronic device of claim 8, further comprising a power selector which outputs the power select signal received at the power controller according to an operation of a user, wherein the standby power supply further supplies the standby power to the power selector.

10. The electronic device of claim 8, wherein the standby power supply receives the electrical power from a battery and outputs the standby power using the received power.

11. The electronic device of claim 10, wherein the battery comprises a detachable battery.

12. The electronic device of claim 10, wherein the battery comprises an internal battery.

13. An electronic device comprising:
a system part to provide a function of the electrical device if an operating power is supplied to the system part;
a control unit which, if the control unit is turned on, controls whether the operating power is received by the system part; and
a power controller which selectively turns on the control unit to allow the control unit to provide the operating power and turns off the control unit to prevent the control unit from providing the operating power,
wherein, when the control unit is turned on
the control unit outputs a latch signal to the power controller, and
the power controller controls the control unit to output the operating power while the latch signal is received at the power controller.

14. The electronic device of claim 13, wherein if a power select signal is received while the control unit is on and indicates that the system part is to be tuned off, the control unit outputs the latch signal indicating that the system part is to be tuned off and the power controller controls the control unit to be turned off to prevent the output of the operating power.

15. The electronic device of claim 13, wherein:
the power controller comprises:
a control power supply which selectively outputs a control power to the control unit in order to control the control unit to be one of turned on and turned off, and
a control power circuit which receives a power select signal and, based on the power select signal, controls whether the control power supply outputs the control power so as to control the control unit, and
if the control unit is turned on due to the receipt of the control power from the control power supply, the control unit outputs the latch signal to the control power circuit to make the control power supply output the control power.

16. The electronic device of claim 15, wherein the control power circuit logically operates the power select signal and the latch signal to output a control power select signal received at the control power supply so as to control whether the control power supply outputs the control power.

17. The electronic device of claim 16, wherein, if at least one of the power select signal and the latch signal has a predetermined logic value, the control power circuit controls the control power supply to output the control power to control the control unit to be turned on.

18. The electronic device of claim 17, wherein the control power circuit comprises a signal delay circuit that delays a change in an output of the control power circuit by a first time after the power select signal is changed between the predetermined logic value and another predetermined logic value.

19. The electronic device of claim 18, further comprising a power selector which outputs the power select signal received at the control unit and the power controller according to an operation of a user, wherein the power selector comprises another signal delay circuit that delays a change in an output from the power selector for a second time after the power select signal has changed between a first predetermined logic value and a second predetermined logic value.

20. The electronic device of claim 19, wherein:
if the second time is at or longer than the first time, the control power circuit outputs the control power select signal to control the control power supply to output the control power, and
if the second time is less than the first time, the control power circuit does not output the control power select signal to control the control power supply to output the control power.

21. The electronic device of claim 15, wherein, if it is sensed that a logic value of the power select signal is changed between first and second states while the electronic device is turned on, the control unit outputs the latch signal to make the control power supply cut the output of the control power.

22. The electronic device of claim 13, wherein, if it is sensed that a logic value of a power select signal is changed between first and second states while the electronic device is turned on, the control unit outputs the latch signal to make the power controller control the control unit to cut the operating power being supplied to the system part.

23. An electronic device comprising:
a system part to provide a function of the electrical device if an operating power is supplied to the system part;
a control unit which, if the control unit is turned on, controls whether the operating power is received by the system part;
a power controller which selectively turns on the control unit to allow the control unit to provide the operating power and turns off the control unit to prevent the control unit from providing the operating power;
a system power supply that transforms supplied electrical power into the operating power to operate the system part, and the control unit controls the system power supply in order to control whether the operating power is received at the system part;
an adapter that transforms received current into one of an alternating current and a direct current, and outputs the transformed current to the system power supply and the control power supply;
an adapter sensor that senses whether electrical power is supplied through the adapter; and
a discharge switch that, if the adapter sensor senses that the electrical power is supplied through the adapter, cuts the electrical power that is otherwise supplied from a battery pack to the system power supply and the control power supply,
wherein the power controller comprises
a control power supply which selectively outputs a control power signal to the control unit in order to control the control unit to be one of turned on and turned off, and
a control power circuit which controls whether the control power supply outputs the control power so as to control the control unit based on a power select signal.

24. The electronic device of claim 23, further comprising a standby power supply which supplies standby power to the control power circuit, wherein, if the discharge switch cuts the electrical power otherwise supplied from the battery pack to the standby power supply, the adapter supplies electrical power to the standby power supply.

25. The electronic device of claim 24, wherein
the adapter sensor outputs an adapter sensing signal having a logic value according to whether the electrical power is supplied through the adapter,
if the control unit is turned on, the control unit outputs a latch signal to the power controller, and
the control power circuit logically operates received ones of the power selecting signal, the latch signal, and the adapter sensing signal to control whether the control power supply outputs the control power.

26. The electronic device of claim 25, wherein, if the adapter sensor senses the logic value indicating that the adapter supplies electrical power therethrough, the control power circuit controls the control power supply to output the control power to control the control unit to be on.

27. A power controller for an electronic device comprising:
a control unit which, if the control unit is turned on, controls whether an operating power is received at a system part of the electronic device output; and
a power controller which selectively turns on the control unit to allow the control unit to provide the operating power and turns off the control unit to prevent the control unit from providing the operating power,
wherein a power select signal is received from a power selector of the electronic device, and the power selector outputs the power select signal to be received at the power controller according to an operation of a user in order to control the power controller to turn on the control unit, and
wherein the power controller comprises a control power circuit which controls whether a control power supply outputs a control power so as to control the control unit based on a power select signal.

28. The power controller for an electronic device of claim 27, wherein the supplied operating power is from a battery connected to the electronic device.

29. A power controller for an electronic device comprising:
a control unit which, if the control unit is turned on, controls whether an operating power is received at a system part of the electronic device output;
a power controller which selectively turns on the control unit to allow the control unit to provide the operating power and turns off the control unit to prevent the control unit from providing the operating power; and
a power selector which outputs a power select signal received at the power controller according to an operation of a user in order to turn on the power controller so as to turn on the control unit,
wherein the power controller comprises
a control power supply which selectively outputs a control power to power the control unit so as to control the control unit to be one of turned on and turned off, and
a control power circuit which receives a power select signal and, based on the power select signal, controls whether the control power supply outputs the control power so as to control the control unit to change between an on and an off state.

30. The power controller for an electronic device of claim 29, further comprising a system power supply that transforms supplied electrical power into the operating power to operate the system part, and the control unit controls the system power supply in order to control whether the operating power is received at the system part.

31. The power controller for an electronic device of claim 30, wherein the control unit controls the system power supply to output the operating power if the control power supply supplies the control power.

32. A power controller for an electronic device comprising:
- a control unit which, if the control unit is turned on, controls whether an operating power is received at a system part of the electronic device output;
- a power controller which selectively turns on the control unit to allow the control unit to provide the operating power and turns off the control unit to prevent the control unit from providing the operating power;
- a system power supply that transforms supplied electrical power into the operating power to operate the system part, and the control unit controls the system cower supply in order to control whether the operating power is received at the system part; and
- a standby power supply which supplies standby power to the control power circuit such that the control power circuit senses the power select signal when the control unit is turned off,
- wherein the control unit controls the system power supply to output the operating power if the control cower supply supplies the control power, and
- wherein the power controller comprises
  - a control power supply which selectively outputs a control power to power the control unit so as to control the control unit to be one of turned on and turned off, and
  - a control power circuit which receives a power select signal and, based on the power select signal, controls whether the control power supply outputs the control power so as to control the control unit to change between an on and an off state.

33. The power controller for an electronic device of claim 32, further comprising a power selector which outputs a power select signal received at the power controller according to an operation of a user, wherein the standby power supply further supplies the standby power to the power selector.

34. A power controller for an electronic device comprising:
- a control unit which, if the control unit is turned on, controls whether an operating power is received at a system part of the electronic device output; and
- a power controller which selectively turns on the control unit to allow the control unit to provide the operating power and turns off the control unit to prevent the control unit from providing the operating power,
- wherein, when the control unit is turned on
  - the control unit outputs a latch signal to the power controller, and
  - the power controller controls the control unit to output the operating power while the latch signal is received at the power controller.

35. The power controller for an electronic device of claim 34, wherein if a power select signal is received while the control unit is on and indicates that the system part is to be tuned off, the control unit outputs the latch signal indicating that the system part is to be tuned off and the power controller controls the control unit to be turned off to prevent the output of the operating power.

36. The power controller for an electronic device of claim 34, wherein:
the power controller comprises:
- a control power supply which selectively outputs a control power to power the control unit so as to control the control unit to be one of turned on and turned off, and
- a control power circuit which receives the power select signal and, based on the power select signal, controls whether the control power supply outputs the control power so as to control the control unit, and
- if the control unit is turned on due to the receipt of the control power from the control power supply, the control unit outputs the latch signal to the control power circuit to make the control power supply output the control power.

37. The power controller for an electronic device claim 36, wherein the control power circuit logically operates the power select signal and the latch signal to output a control power select signal received at the control power supply so as to control whether the control power supply outputs the control power.

38. The power controller for an electronic device claim 37, wherein, if at least one of the power select signal and the latch signal has a predetermined logic value, the control power circuit controls the control power supply to output the control power to control the control unit to be turned on.

39. The power controller for an electronic device claim 38, wherein the control power circuit comprises a signal delay circuit that delays a change in an output of the control power circuit by a first time after the power select signal is changed between the predetermined logic value and another predetermined logic value.

40. The power controller for an electronic device claim 39, further comprising a power selector which outputs the power select signal received at the control unit and the power controller according to an operation of a user, wherein the power selector comprises another signal delay circuit that delays a change in an output from the power selector for a second time after the power select signal has changed between a first predetermined logic value and a second predetermined logic value.

41. The power controller for an electronic device claim 40, wherein:
if the second time is at or longer than the first time, the control power circuit outputs the control power select signal to control the control power supply to output the control power, and
if the second time is less than the first time, the control power circuit does not output the control power select signal to control the control power supply to output the control power.

42. The power controller for an electronic device claim 36, wherein, if it is sensed that a logic value of the power select signal is changed between first and second states while the electronic device is turned on, the control unit outputs the latch signal to make the control power supply cut the output of the control power.

43. The power controller for an electronic device claim 34, wherein, if it is sensed that a logic value of the power select signal is changed between first and second states while the electronic device is turned on, the control unit outputs the latch signal to make the power controller control the control unit to cut the operating power being supplied to the system part.

* * * * *

UNITED STATES PATENT AND TRADEMARK OFFICE
CERTIFICATE OF CORRECTION

PATENT NO. : 7,321,973 B2 Page 1 of 1
APPLICATION NO. : 10/831366
DATED : January 22, 2008
INVENTOR(S) : Yeong-bok Choi et al.

It is certified that error appears in the above-identified patent and that said Letters Patent is hereby corrected as shown below:

Column 13, Line 19, change "operating;" to --operating power;--.

Column 17, Line 18, change "cower" to --power--.

Column 17, Line 26, change "cower" to --power--.

Signed and Sealed this

First Day of July, 2008

JON W. DUDAS
*Director of the United States Patent and Trademark Office*